United States Patent Office 3,027,231
Patented Mar. 27, 1962

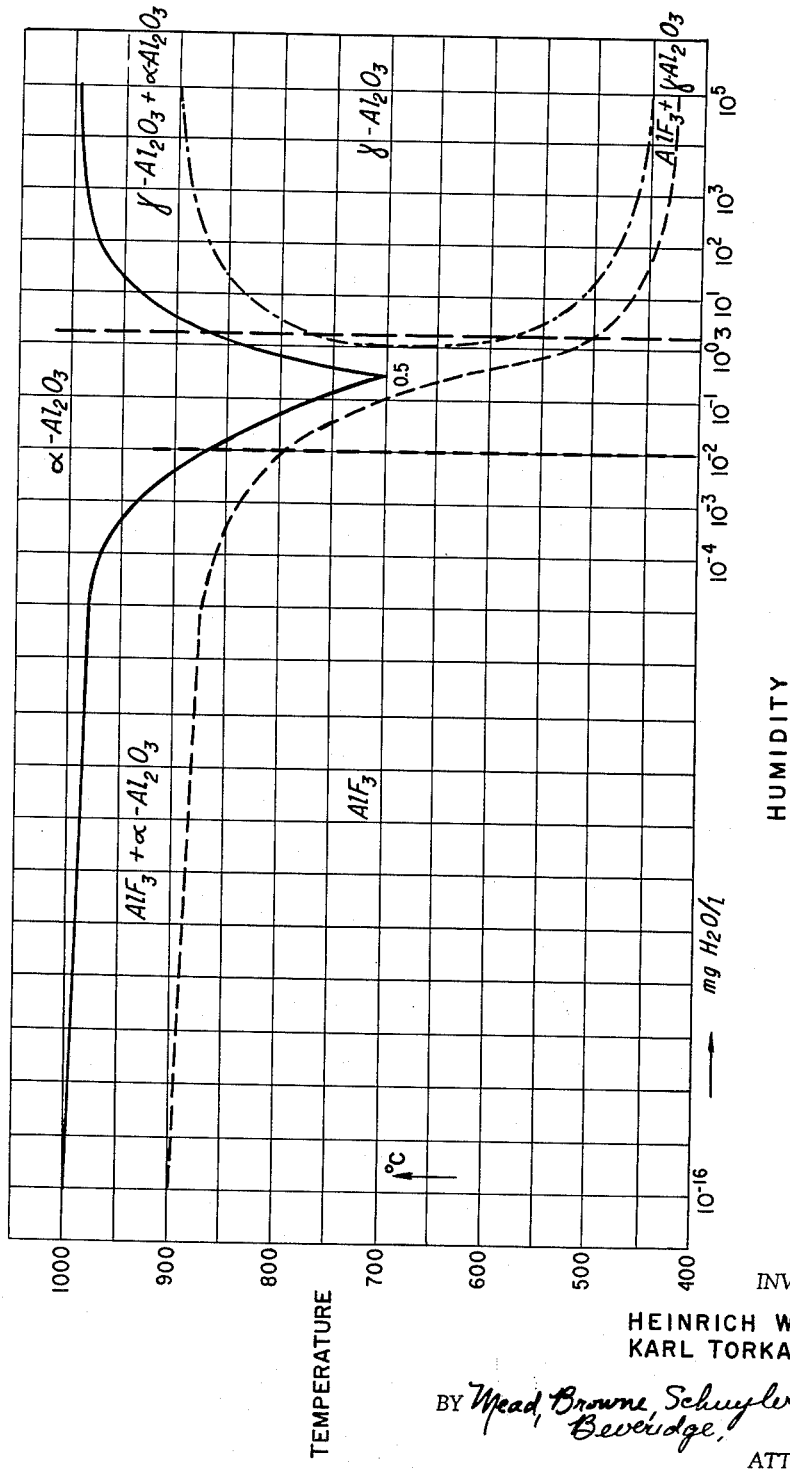

3,027,231
PROCESS FOR THE PRODUCTION OF α-ALUMINA FROM ALUMINUM FLUORIDE
Heinrich Worel, Vienna, and Karl Torkar, Graz, Austria, assignors to Peter Spence & Sons Limited, Widnes, England, a British company, and Deutsche Gold- und Silber-Scheideanstalt vormals Roessler, Frankfurt, German, a German joint-stock company
Filed May 2, 1958, Ser. No. 732,433
Claims priority, application Great Britain May 11, 1957
7 Claims. (Cl. 23—142)

This invention is concerned with a process for producing corundum (α-alumina).

Aluminium oxide as such or as hydrous alumina finds application in the chemical industry, pre-eminently in oil working and refining, as a catalyst or catalyst support. For catalytic purposes, it is important not only to have the material in the purest possible state, but with regard to catalytic activity, in the most definite and reproducible form possible. Such a requirement is not confined only to the shape and size of the particles in which the catalyst or support is to be used, but applies also to its modification, through a correct choice of which a known directing of the catalytic process is made possible or improved. Consequently it is to be recommended, in the production of pure aluminum oxide, that the form and composition of the product with regard to the resulting modification of the oxide or hydroxide be not left more or less to chance, but through definite production conditions desired end products of greatest possible uniformity be obtained reproducibly.

An object of the present invention is to produce a method of preparing corundum (α-alumina) at comparatively low temperatures.

In one form of the invention the aluminium fluoride is heated to a temperature within the range 700–975° C. in air, oxygen or an oxygen containing gaseous mixture having a humidity lying within the range $10^{-4}$ to $10^2$ mg. $H_2O$ per litre.

In one preferred form of the invention, the aluminium fluoride is heated to a temperature within the range 700–900° C. in a stream of air, oxygen or an oxygen containing gaseous mixture having a rate of flow of 12 litres per hour and a humidity lying within the range $10^{-2}$ to 3 mg. $H_2O$ per litre.

In a specific form of the invention, the aluminium fluoride is heated at a temperature of 700° C. in a stream of air, oxygen or an oxygen containing gaseous mixture having a rate of flow of 12 litres per hour and a humidity of 0.5 mg $H_2O$ per litre.

The invention will now be more particularly described by reference to the following example and to the graph illustrated in the drawing.

EXAMPLE

The composition of the $AlF_3$ used had the following constitution:

| | |
|---|---|
| F | 64–65%. |
| Al as $AlF_3$ | 30–31%. |
| $SiO_2$ | Max. 0.2%. |
| $Fe_2O_3$ | Max. 0.1%. |
| $H_2O$ | Max. 0.5%. |
| $Al_2(SO_4)_3$ | Max. 1%. |
| Na | Max. 0.2% (ca. 0.4% NaF). |
| $Al_2O_3$ | Max. ca. 2.5 (residue). |

The series of experiments were carried out in an electrical resistance oven.

Apart from temperature and humidity of the gases, the rate of flow of the gas, and the type of gas (compressed air, laboratory air and oxygen) were varied. The gas humidity was varied from $10^{-16}$ to $10^4$ mg. $H_2O$ per litre.

The heating series was carried out as follows: The $AlF_3$ was put into a Degussite boat, i.e. a porcelain elongated crucible, and this taken to 450° C. in the Pythagoras tube. Every 12 hours a small part of the sample was taken out for X-ray examination and the temperature raised 50° C. Rate of gas flow 12 or 25 litres per hour.

As will be evident from the graph of the drawing, at humidities in the range $10^{-16}$ to $10^{-3}$ mg. $H_2O$ per litre of gas, there is direct conversion of $AlF_3$ to $\alpha$-$Al_2O_3$ at 950–1000° C. At $10^{-2}$ mg., the conversion temperature drops to 850° C., and at $10^{-1}$ to 750° C.

When air with a humidity of 0.5 mg. $H_2O$ per litre is used, the $AlF_3$ goes to $\alpha$-$Al_2O_3$ at 700° C., the lowest conversion temperature observed.

If the humidity is raised to 3 mg. $H_2O$ per litre, there appears a product which exhibits an X-ray powder diagram of $\gamma$-alumina with intensity displacement of the lines and some additional lines between $AlF_3$ and the $\alpha$-$Al_2O_3$ phase. This $\gamma$-like region is, at 3 mg. $H_2O$ per litre, already fairly large (550–900° C.) and broadens with increased moisture content of the gas; e.g. at 11 mg. $H_2O$ per litre (corresponding to ca. laboratory air) from 500 to 950° C. With pure water vapour this $\gamma$-like product is formed at 450° C. and only goes to $\alpha$- at 1000° C.

Thus it will be appreciated that a humidity of 0.5 mg. $H_2O$ per litre is of particular importance; detailed results are as follows.

Table I

Type of gas: Air from a compressed air supply, 12 litres per hour.
Grain size $AlF_3$: 120–260 mg.
Humidity: 0.5 mg. $H_2O$ per litre produced by $H_2SO_4$, d.=168).

| Temp. | Time | Product |
|---|---|---|
| 450 | 12 | $AlF_3$. |
| 500 | 24 | $AlF_3$. |
| 550 | 36 | $AlF_3$. |
| 600 | 48 | $AlF_3$. |
| 650 | 60 | $AlF_3$. |
| 700 | 72 | $\alpha$-$Al_2O_3$ (preponderant). |
| 750 | 84 | $\alpha$-$Al_2O_3$ (sharp). |
| 800 | 96 | $\alpha$-$Al_2O_3$ (sharp). |
| 850 | 108 | $\alpha$-$Al_2O_3$ (sharp). |
| 900 | 120 | $\alpha$-$Al_2O_3$ (sharp). |
| 950 | 132 | $\alpha$-$Al_2O_3$ (sharp). |
| 1,000 | 144 | $\alpha$-$Al_2O_3$ (sharp). |

The time dependence at 700° C. was studied, grain size and the rate of flow of air being varied. The time dependence is shown in Table II.

At grain size of 2 mg. and higher rates of flow of gas (25 litres per hour) no alteration of these values was found. From previous experiments, the gas used (oxygen, compressed air or laboratory air) has no influence in varying the conversion.

Table II

Type of gas: Air from a compressed air supply, 12 litres per hour.
Humidity: 0.5 mg. $H_2O$ per litre.
Grain size of $AlF_3$: 120–260 mg.
Temperature: 700° C.

| Time | Product |
|---|---|
| 50 min | $AlF_3$. |
| 90 min | $AlF_3$. |
| 3 hrs | $AlF_3$. |
| 6 hrs | $AlF_3$ + trace $\alpha$-$Al_2O_3$. |
| 10 hrs | $AlF_3$ + trace $\alpha$-$Al_2O_3$. |
| 18 hrs | Partially $\alpha$-$Al_2O_3$. |
| 26 hrs | Predominantly $\alpha$-$Al_2O_3$. |
| 42 hrs | $\alpha$-$Al_2O_3$. |

Thus, with a slowly rising temperature (all 12 hrs. increments of 50° C.) one obtains with passage of air at 0.5 mg. $H_2O$ per litre the lowest conversion temperature (700° C.) for conversion of $AlF_3$ to $\alpha\text{-}Al_2O_3$. Lower humidity raises the conversion temperature; with higher humidity there appears between $AlF_3$ and $\alpha\text{-}Al_2O_3$ an ever extending $\gamma$-like region.

We claim:

1. A process of preparing corundum ($\alpha$-alumina) comprising heating aluminium fluoride in a gaseous medium selected from the group consisting of air, oxygen and an oxygen containing gaseous mixture, to a temperature within the range 700–1000° C., said gaseous medium having a humidity lying within the range $10^{-16}$ to 3 mg. $H_2O$ per litre, the humidity of said gaseous medium at a given temperature within said temperature range corresponding to that indicated by the solid line of the accompanying graph.

2. A process of preparing corundum ($\alpha$-alumina) comprising heating aluminium fluoride to a temperature within the range 700–975° C. in a gaseous medium selected from the group consisting of air, oxygen and an oxygen containing gaseous mixture, said gaseous medium having a humidity lying within the range $10^{-4}$ to $10^2$ mg. $H_2O$ per litre, the humidity of said gaseous medium at a given temperature within said temperature range corresponding to that indicated by the solid line of the accompanying graph.

3. A process of preparing corundum ($\alpha$-alumina) comprising heating aluminium fluoride to a temperature within the range 700–900° C. in a gaseous medium selected from the group consisting of air, oxygen and an oxygen containing gaseous mixture, said gaseous medium having a humidity lying within the range $10^{-2}$ to 3 mg. $H_2O$ per litre, the humidity of said gaseous medium at a given temperature within said temperature range corresponding to that indicated by the solid line of the accompanying graph.

4. A process of preparing corundum ($\alpha$-alumina) comprising heating aluminium fluoride to a temperature of 700° C. in a gaseous medium selected from the group consisting of air, oxygen and an oxygen containing gaseous mixture, said gaseous medium having a humidity of 0.5 mg. $H_2O$ per litre.

5. A process of preparing corundum ($\alpha$-alumina) comprising heating aluminium fluoride to a temperature within the range 700–900° C. in a stream of a gaseous medium selected from the group consisting of air, oxygen and an oxygen containing gaseous mixture, said gaseous medium having a rate of flow of 12 litres per hour and a humidity lying within the range $10^{-2}$ to 3 mg. $H_2O$ per litre, the humidity of said gaseous medium at a given temperature within said temperature range corresponding to that indicated by the solid line of the accompanying graph.

6. A process of preparing corundum ($\alpha$-alumina) comprising heating aluminium fluoride to a temperature of 700° C. in a stream of a gaseous medium selected from the group consisting of air, oxygen and an oxygen containing gaseous mixture, said gaseous medium having a rate of flow of 12 litres per hour and a humidity of 0.5 mg. $H_2O$ per litre.

7. A process of preparing corundum ($\alpha$-alumina) comprising heating aluminium fluoride to a temperature of 700° C. in a stream of air obtained from a compressed air supply and having a rate of flow of 12 litres per hour and a humidity of 0.5 mg. $H_2O$ per litre.

References Cited in the file of this patent

UNITED STATES PATENTS

| 2,333,948 | Muskat | Nov. 9, 1943 |
| 2,614,028 | Schaumann | Oct. 14, 1952 |
| 2,833,622 | Roberts et al. | May 6, 1958 |

FOREIGN PATENTS

| 165,589 | Australia | Oct. 13, 1955 |

OTHER REFERENCES

Mellor: "Comprehensive Treatise on Inorganic and Theoretical Chemistry," vol. 5, pages 261 and 300 to 302, Longman, Green & Co., New York, 1924.